United States Patent Office 3,719,621
Patented Mar. 6, 1973

3,719,621
PROCESS FOR PREPARING POLYURETHANES IN AN ISOCYANATE-REACTIVE SOLVENT SOLUTION
Herwart C. Vogt, Grosse Ile, and Wayne G. Lajiness, Wyandotte, Mich., assignors to BASF Wyandotte Corporation, Wyandotte, Mich.
No Drawing. Continuation-in-part of application Ser. No. 813,322, Apr. 3, 1969, which is a continuation-in-part of application Ser. No. 629,919, Mar. 30, 1969, both now abandoned. This application May 21, 1971, Ser. No. 145,879
Int. Cl. C08g 22/16, 51/26, 51/34
U.S. Cl. 260—30.4 N                                10 Claims

ABSTRACT OF THE DISCLOSURE

A cosolvent system of a monohydric alcohol and an inert solvent, miscible therewith, is used to prepare a urethane polymer by reacting an isocyanate-terminated prepolymer, dissolved in the inert solvent, with a diamine chain-extending agent, dissolved in the monohydric alcohol solvent. The urethane polymer prepared in this manner forms a homogeneous solution of pronounced lower viscosity in the cosolvents utilized. The urethane polymer is thermoplastic, has excellent film-forming characteristics, and may be used in preparing coatings, films, castings, and like products.

CROSS-REFERENCE TO RELATED APPLICATIONS

This application is a continuation-in-part of copending application Ser. No. 813,322, filed Apr. 3, 1969 now abandoned, which is a continuation-in-part of application Ser. No. 626,919, filed Mar. 30, 1967, now abandoned.

BACKGROUND OF THE INVENTION

(1) Field of the invention

This invention relates to the preparation of urethane polymers by polymerization in solvent solution. In a more particular aspect, this invention relates to the preparation of thermoplastic urethane polymers by the chain-extension of isocyanate-terminated prepolymers with a diamine chain-extender, in the presence of an isocyanate reactive cosolvent system, to produce a urethane polymer which is completely soluble in the cosolvent system.

By the term "isocyanate reactive cosolvent system" is meant a solvent system which consists essentially of (a) an inert solvent, and (b) a monohydric alcohol. An inert solvent is one which does not react with the isocyanate. Thus, inert solvents, such as toluene, benzene, tetrahydrofuran, and the like, are inert or non-reactive with free isocyanate groups at room temperature. A monohydric alcohol, conversely, is capable of reaction with free isocyanate groups. Solvents, such as primary, secondary, and tertiary monohydric alcohols, and the like, are therefore able to react with free isocyanate groups.

(2) Prior art

The chain-extension of isocyanate-terminated prepolymers by diamines is well known in the polyurethane art. Thus, melt, latex, emulsion, solvent and the like polymerization reactions have been disclosed in the literature. Solvent or solution type polymerization reactions of the prior art, however, have been characterized in that the solvents utilized are inert or non-reactive with free isocyanate groups. In many of these solvent systems, the urethane polymer produced by the chain-extension reaction is insoluble in the solvents and the polymer precipitates out of solution. Thus, a film-forming urethane polymer solution is not obtained. In other instances, where the urethane polymer is soluble in the inert solvent, we find that the solvent system employed requires the use of very high boiling, slow drying and expensive polar solvents.

In other instances, where the urethane polymer is soluble in the inert solvent, we find that the solvent system employed has very high viscosities making it difficult to handle. Often to circumvent this high viscosity it is necessary to decrease the polymer concentration in the inert solvent system, thus requiring multiple application to achieve the desired film thickness. Therefore, polymerization reactions conducted in inert solvents wherein the polymer is soluble provide products having serious film-forming, drying, curing, viscosity and the like difficulties.

OBJECTS OF THE INVENTION

It is, therefore, a specific object of this invention to provide a process for the preparation of a urethane polymer by a chain-extension polymerization procedure taking place in an isocyanate reactive cosolvent system.

Another object of this invention is to provide a polymerization procedure wherein the urethane polymer produced is soluble in the cosolvent system and thereby yields a homogeneous solution. A further object is to provide a process wherein the homogeneous solution is stable for an extended period of time.

A still further object is to provide a process for the preparation of a thermoplastic urethane polymer in a homogeneous solution which has excellent drying and film-forming characteristics.

DESCRIPTION OF THE PREFERRED EMBODIMENT

The objects of this invention are obtained by providing a process for the preparation of a urethane polymer by a solution polymerization process wherein an isocyanate-terminated prepolymer is chain-extended with a diamine and wherein the polymerization is conducted in the presence of a cosolvent which comprises an inert solvent and a monohydric alcohol solvent which is miscible with the inert solvent.

The preparation of urethane polymers by the chain-extension of isocyanate-terminated prepolymers in a cosolvent system containing a monohydric alcohol solvent is to our knowledge not known or disclosed in the art. The prior art has only taught the use of monohydric alcohols as chain-terminating agents or molecular weight control agents for polyurethane chain-extension reactions with diamines. See for instance U.S. Pat. Nos. 3,373,143; 3,503,934; and 3,384,623.

It, therefore, was completely unexpected and surprising to discover that isocyanate-terminated prepolymers could be chain-extended with a diamine by the process of this invention to yield clear, colorless, and homogeneous solutions of a urethane polymer in an isocyanate reactive cosolvent system, such as toluene-isopropanol, toluene-ethanol, methanol-benzene, and the like.

While it is not intended to limit the invention to any particular theory, it is believed that a preferential reaction takes place between the diamine chain-extending agent and the prepolymer. This occurs because of the greater reactivity between the hydrogen atoms of the diamine chain-extending agent and the free isocyanate groups of the prepolymer than as between the active hydrogen atoms of the monohydric alcohol solvent and the free isocyanate groups of the prepolymer. This sharp differential in rates of reactivity enables preparation of a stable, homogeneous solution of a urethane polymer in the isocyanate reactive cosolvent system, without any substantial reaction of the active hydrogen atoms of the alcohol solvent with the free isocyanate groups of the prepolymer because of the preferential diamine-prepolymer reaction.

Evidence of minimal chain termination arising from the reaction of —NCO with monohydric alcohol is realized as determined by the excellent physical properties of the films prepared from these cosolvent systems. Because of the high concentration of monohydric alcohol present in the cosolvent system, it would be expected that if chain termination occurs the polyurethane would be of such a low molecular weight as to yield an unusable material.

Another unique and surprising result of this invention is that it is now possible to chain-extend an isocyanate-terminated prepolymer to a high molecular weight linear urethane polymer solution with a diamine chain-extending agent having a reactive hydrogen atom functionality of greater than two. By a diamine having a reactive hydrogen atom functionality of greater than two is meant a diamine capable of reacting with more than two free isocyanate groups, e.g. N-hydroxypropyl ethylenediamine ($H_2N$—$CH_2$—$CH_2$—$NH$—$C_3H_6OH$) which has a functionality of four. This feature of the present invention is unexpected because it is a well-known fact that chain-extending agents having functionalities greater than two produce the formation of "infinite networks," i.e. cause gelation and insolubilization. In this regard, see Chapter IX, Principles of Polymer Chemistry, Flory, Paul J., Cornell University Press, 1953.

The isocyanate-terminated prepolymers which may be utilized in the practice of this invention are well known to those skilled in the polyurethane art. Thus, difunctional isocyanate-terminated polyether, polyester and polyurethane prepolymers may be used. These compounds are prepared by methods well known in the art. Thus, for example, about one molar proportion of a polyol, such as a propylene oxide adduct of propylene glycol, is reacted under substantially anhydrous conditions with about one molar proportion of an organic diisocyanate for each hydroxyl group of the polyol to produce an isocyanate-terminated polyether urethane prepolymer having a free NCO group at each terminus of the molecule. Isocyanate-terminated polyester and polyurethane prepolymers may be prepared in like manner.

Representative difunctional isocyanate - terminated polyether, polyester and polyurethane compounds include reaction products of polyoxyalkylene glycols with an excess of organic diisocyanate, reaction products of hydroxy- and carboxy-terminated difunctional polyesters with an excess of an organic diisocyanate, and reaction products of difunctional polyurethane compounds terminated with reactive hydrogen-containing groups, as determined by the Zerewitinoff reaction, and an excess of an organic diisocyanate. The isocyanate-terminated prepolymers and starting materials described and prepared according to U.S. Pat. No. 3,148,173 may also be used as chain-extending agents or components thereof in the practice of this invention.

Any of a wide variety of organic diisocyanates may be employed to react with the polyols to prepare these polyurethane polymers, including aromatic, aliphatic and cycloaliphatic diisocyanates and combinations of these types. It is to be understood that mixtures of two or more organic diisocyanates may be used. Representative compounds include toluene-2,4-diisocyanate, m-phenylene diisocyanate, 4-chloro-1,3-phenylene diisocyanate, 4,4'-diphenylmethane diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis(cyclohexylisocyanate) and 1,5 - tetrahydronaphthylene diisocyanate. Compounds such as toluene-2,4-diisocyanate and 1,6-hexamethylene diisocyanate are particularly desirable.

The diamine chain-extending agents utilized in the practice of this invention may be difunctional, primary or secondary aliphatic, aromatic and alicyclic organic diamine compounds. Representative aliphatic diamines include ethylenediamine, hexamethylene diamine, 1,4-butane diamine, N-hydroxypropyl ethylenediamine, 1,4-cyclohexane bis(methylamine), and the like compounds. Representative aromatic diamines include methylene dianiline, 2,4-tolylene diamine, 1,5-naphthylene diamine, and the like compounds. Representative alicyclic diamines include 1,4-cyclohexyl diamine, 2-methyl piperazine, piperazine, and the like compounds. Other compounds, such as inorganic nitrogen compounds, for example hydrazine and the like compounds, are within the contemplation of this invention.

In preparing the urethane polymers of this invention, the isocyanate-terminated prepolymers discussed above are dissolved in an inert solvent. The inert solvents are not active hydrogen-containing compounds. They therefore are not reactive with the free isocyanate groups present in the prepolymers. Representative inert solvents are toluene, benzene, dimethyl formamide, dimethylsulfoxide, tetrahydrofuran, and the like compounds.

The diamine chain-extending agents discussed above are dissolved in the monohydric alcohol solvent which must be miscible with the inert solvent used to prepare the isocyanate-terminated prepolymer solution. Representative alcohol solvents are primary, and secondary alcohols, and the like compounds, such as methanol, ethanol, isopropyl alcohol and butanol. Although the solvent compounds normally are capable of reacting and are conventionally used to react with the isocyanate-terminated prepolymers to cause chain-termination, this reaction, however, does not occur to any appreciable or detrimental extent when operating according to the process of this invention for the reasons discussed hereinbefore.

The urethane polymers of this invention are prepared by reacting a solution of the isocyanate-terminated prepolymer in an inert solvent with a solution of the diamine chain-extending agent in an alcohol solvent. The cosolvent system should contain from about 10% to 90% by weight of prepolymer plus diamine compound, and from about 90% to 10% by weight of inert plus alcohol solvents. If the solids content exceeds about 90% by weight, a very high viscosity results and it is difficult to maintain the desired stoichiometry of the reaction. If the solids content is below about 10% by weight, the reaction is not economical in regard to the amount of urethane polymer produced and the dilution effect increases the chance of alcohol solvent reaction with the prepolymer.

The ratio of inert solvent to alcohol solvent is not critical and may vary widely within the broad range of 4:1 to 1:4 parts by weight of the combined solvents. The particular ratio selected within this broad range is dictated by the particular prepolymer and diamine chain-extender utilized.

The urethane polymers of this invention may be produced with widely varying diamine chain-extending agent to isocyanate-terminated prepolymer ratios. However, those urethane polymers having the most desirable physical properties, modulus, tensile strength and tear strength, are prepared at relatively narrow amine/NCO ratios. The amine/NCO ratio should therefore be from about 0.9/1 to 1.1/1. If urethane polymers are prepared outside this range, drastically reduced physical properties are obtained as seen in the examples below. The preferred amine/NCO ratio is about 1.0/1.0.

The reaction to obtain the urethane polymers of this invention is carried out by mixing a solution of the diamine chain-extending agent in an alcohol solvent with a solution of the isocyanate-terminated prepolymer in an inert solvent. The reaction may be conducted over a wide temperature range, such as from about —10° C. to the reflux temperature of the cosolvent mixture. The product is produced in the form of a homogeneous urethane polymer solution. By a homogeneous urethane polymer solution, we mean that the alcohol and inert solvents are miscible with each other and that the urethane polymer produced is soluble in the cosolvent mixture to form a true and stable solution. The urethane polymer solution produced by the process of this invention has excellent drying and film-forming characteristics.

The invention is further illustrated but not limited by the following examples in which parts and percentages given are by weight. In the examples, the physical properties of the cast films were determined in accordance with the following ASTM procedures:

| | |
|---|---|
| Tensile strength | D638-64T |
| Modulus | D638-64T |
| Elongation | D638-64T |
| Tear strength | D1938-62T |
| Hardness | D676-59T |

EXAMPLE I (A) Isocyanate-terminated prepolymer solution 10 grams of an isocyanate-terminated prepolymer, a 7 mole toluene diisocyanate adduct of 4 moles of a 550 molecular weight polyoxypropylene glycol, having a free isocyanate value of 4.61%, were dissolved in 409 grams of toluene and placed in a 1-liter reaction flask equipped with a stirrer, thermometer, water-cooled condenser, and graduated dropping funnel.

(B) Chain-extending agent solution 7.68 grams of 2-methylpiperazine were placed in a 50-milliliter beaker and dissolved in 204.5 grams of ethanol.

(C) Preparation of urethane polymer solution

Chain-extending agent (B) was added at room temperature and with vigorous stirring to the isocyanate-terminated prepolymer (A) in the reaction flask. During the addition the temperature of the reaction mixture increased from about 25° C. to 28° C. The stirring was continued for about 30 minutes and a clear homogeneous urethane polymer solution was obtained. The urethane polymer solution had a Gardner viscosity of D-E at a 16.6% solids concentration. The isolated urethane polymer had a reduced viscosity in dimethyl sulfoxide, ¼ gram urethane polymer per 100 milliliters, of 0.52.

A film cast from the urethane polymer solution had the following physical properties:

| | |
|---|---|
| Film thickness, mil | 7-10 |
| Tensile strength, p.s.i. | 7,500 |
| Modulus, p.s.i.: | |
| 300% | 6,000 |
| 100% | 5,100 |
| Elongation, percent | 320 |
| Split tear strength, p.s.i. | 700 |
| Shore Hardness | 94-90 |

EXAMPLE 2

A urethane polymer solution was prepared using the same process, equipment, and reactants as Example 1 except that the 2-methyl piperazine chain-extending agent was dissolved in 205 grams of isopropyl alcohol. The clear, homogeneous urethane polymer solution produced had a Gardner viscosity of S-T at a 15% solids concentration. The isolated urethane polymer had a reduced viscosity in dimethyl sulfoxide, ¼ gram urethane polymer per 100 milliliters, of 0.64. A film cast from the urethane polymer solution had the following physical properties:

| | |
|---|---|
| Film thickness, mil | 8-12 |
| Tensile strength, p.s.i. | 9,900 |
| Modulus, p.s.i.: | |
| 300% | -- |
| 100% | 4,600 |
| Elongation, percent | 290 |
| Split tear strength, p.s.i. | 762 |
| Shore Hardness | 96-93 |

EXAMPLE 3—COMPARATIVE EXAMPLE

A urethane polymer latex was prepared according to the procedure of Example 1 of U.S. Pat. 3,294,724. The same reactants, prepolymer and chain-extending agent as Examples 1 and 2 above were utilized. A film, prepared from this latex, was cast on a glass plate and air-dried overnight at 25° C., followed by fusing for 10 minutes at 150° C. in an air-circulating oven. Table I below compares the physical properties of this latex-prepared film properties of Examples 1 and 2 which were prepared according to the process of this invention.

TABLE I

| Example | Film thickness (mil) | Tensile strength (p.s.i.) | Modulus, p.s.i. 300% | Modulus, p.s.i. 100% | Elongation, percent | Split tear, p.s.i. | Shore hardness |
|---|---|---|---|---|---|---|---|
| 1 | 7-10 | 7,500 | 6,000 | 5,100 | 320 | 700 | 94-90 |
| 2 | 8-12 | 9,900 | | 4,600 | 290 | 762 | 96-93 |
| 3 (latex) | 12-15 | 5,000 | 4,000 | 2,000 | 400 | 400 | 85 |

It is evident that the physical film properties of Examples 1 and 2 of this invention compare very favorably with those properties of the film produced according to the conventional latex procedure. In fact, the tensile strength, stress-strain properties were improved. It should also be noted that the latex procedure requires a fusion technique which is not required in the preparation of films from the urethane polymer solutions of the present invention. Also, the latex procedure requires the use of a surfactant, not required in the present invention, which reduces hydrolytic stability.

EXAMPLE 4 AND COMPARATIVE EXAMPLE 5

(A) Isocyanate-terminated prepolymer solution

A prepolymer solution prepared as described in Example 1 was utilized.

(B) Chain-extending agent solution 9.09 grams of N-hydroxypropyl ethylene diamine were placed in a 500-milliliter beaker and dissolved in 206 grams of isopropanol.

(C) Preparation of urethane polymer solution

Chain-extending agent (B) was added at room temperature with vigorous stirring, to the isocyanate-terminated prepolymer (A) in the reaction flask. During the addition the temperature of the reaction mixture increased from about 24° C. to 28° C. The stirring was continued for about 30 minutes and a clear homogeneous urethane polymer solution was obtained. The urethane polymer solution had a Gardner viscosity of I–J at a 15% solids.

A film cast from the urethane polymer solution had the following physical properties as compared to a film prepared from the same reactants but utilizing the latex procedure as described in Example 3 above:

TABLE II

| Example | Film thickness (mil) | Tensile strength (p.s.i.) | Modulus, p.s.i. 300% | Modulus, p.s.i. 100% | Elongation, percent | Split tear, p.s.i. | Shore hardness |
|---|---|---|---|---|---|---|---|
| 4 | 10–12 | 9,700 | 6,200 | 2,800 | 410 | 665 | 89–80 |
| 5 (latex) | 10–15 | 6,000 | 2,000 | 700 | | 270 | 80–90 |

EXAMPLE 6

(A) Isocyanate-terminated prepolymer solution 150 grams of an isocyanate-terminated prepolymer, a 2 mole toluene diisocyanate adduct of 1 mole of a 1,200 molecular weight polyoxypropylene glycol, having a free isocyanate value of 3.89%, were dissolved in 426 grams of toluene and placed in a 1-liter reaction flask equipped with a stirrer, thermometer, water-cooled condenser, and graduated dropping funnel.

(B) Chain-extending agent solution 9.70 grams of 2-methylpiperazine were placed in a 500-milliliter beaker and dissolved in 313 grams of ethanol.

(C) Preparation of urethane polymer solution

Chain-extending agent (B) was added at room temperature and with vigorous stirring to the isocyanate-terminated prepolymer (A) in the reaction flask. During the addition the temperature of the reaction mixture increased from about 22° to 27° C. The stirring was continued for about 1 hour and a clear homogeneous urethane polymer solution was obtained. The urethane polymer solution had a Gardner viscosity of W–X at a 28% solids concentration. The isolated urethane polymer had a reduced viscosity in dimethyl sulfoxide, ¼ gram urethane polymer per 100 milliliters, of 0.29.

A film cast from the urethane polymer solution had the following physical properties.

Film thickness, mil _____ 5–8
Tensile strength, p.s.i. _____ 2,000
Modulus, p.s.i.
  300% _____ 800
  100% _____ 400
Elongation, percent _____ 905
Split tear strength, p.s.i. _____ 160
Shore Hardness _____ 51–42

EXAMPLE 7

(A) Isocyanate-terminated prepolymer preparation 883 grams of a hydroxyl-terminated polyester, prepared from the reaction of 2630 grams of adipic acid, 769 grams of ethylene glycol and 650 grams of propylene glycol, having a molecular weight of 1875 and an acid number of 1.4 were mixed and reacted with 117 grams of tolylene diisocyanate mixed isomers (80% 2,4 isomer and 20% 2,6 isomer) at a temperature of 120° C. for about three hours. The free isocyanate content of the prepolymer so prepared was 1.54%.

(B) Isocyanate-terminated prepolymer solution 100 grams of the isocyanate-terminated polyester prepolymer, prepared above, were dissolved in 500 grams of dimethyl formamide and placed in a 1-liter reaction flask equipped with a stirrer, thermometer, water-cooled condenser, and graduated dropping funnel.

(C) Chain-extending agent solution 2.16 grams of N-hydroxypropyl ethylene diamine were placed in a 100-milliliter beaker and dissolved in 25 grams of methanol.

(D) Preparation of urethane polymer solution

Chain-extending agent (C) was added at room temperature and with vigorous stirring to the isocyanate-terminated polyester prepolymer (B) in the reaction flask. During the addition the temperature of the reaction mixture increased from about 25° C. to about 28° C. The stirring was continued for about 30 minutes and a clear homogeneous urethane polymer solution was obtained.

A film cast from the urethane polymer solution had the following physical properties:

Film thickness, mil _____ 7–10
Tensile strength, p.s.i. _____ 1,255
Elongation, percent _____ 933
Shore hardness _____ 45

EXAMPLES 8–15

(A) Isocyanate-terminated prepolymer solution 100 grams of an isocyanate-terminated prepolymer, a 7 mole toluene diisocyanate adduct of 4 moles of a 550 molecular weight polyoxypropylene glycol, having a free isocyanate value of 4.61%, were dissolved in 409 grams of toluene and placed in a 1-liter reaction flask equipped with a stirrer, thermometer, water-cooled condenser, and graduated dropping funnel.

(B) Chain-extending agent solution 9.09 grams of N-hydroxypropyl ethylene diamine were placed in a 500-milliliter beaker and dissolved in 206 grams of ethanol.

(C) Preparation of urethane polymer solution

A series of urethane polymer solutions were prepared by reacting varying ratios of chain-extending agent to isocyanate-terminated prepolymer, i.e., the amine/NCO ratio was investigated. The chain-extending agent (B) was added at room temperature and with vigorous stirring to the isocyanate-terminated prepolymer (A) in the reaction flask. During the addition the temperature of the reaction increased from about 25° C. to 28° C. The stirring was continued for about 30 minutes and clear homogeneous urethane polymer solution were obtained.

Films cast from the urethane polymer solutions had the following physical properties, which are listed in Table III:

TABLE III

| | Example | | | | | | | |
|---|---|---|---|---|---|---|---|---|
| | 8 | 9 | 10 | 11 | 12 | 13 | 14 | 15 |
| Amine/NCO | 0.75 | 0.85 | 0.90 | 0.95 | 1.0 | 1.05 | 1.20 | 1.30 |
| Tensile strength, p.s.i. | | | 1,390 | 4,800 | 6,900 | 6,600 | | |
| Modulus, p.s.i.: | | | | | | | | |
| 300% | Poor film | | | 4,600 | 5,300 | 3,400 | Poor film | |
| 100% | Poor film | | 1,375 | 1,800 | 1,900 | 1,500 | Poor film | |
| Elongation, percent | | | 148 | 320 | 380 | 450 | | |
| Split tear strength, p.s.i. | | | 280 | | | | | |

It is evident from the above film property values, that the amine/NCO ratio of the urethane polymer solution should be from about 0.90/1 to 1.1/1. At amine/NCO ratios outside these limts, the films produced from the urethane polymer solutions are of poor quality.

EXAMPLES 16–22

(A) Isocyanate-terminated prepolymer solution 100 grams of an isocyanate-terminated prepolymer, a 7 mole toluene diisocyanate adduct of 4 moles of a 550 molecular weight polyoxypropylene glycol, having a free isocyanate value of 4.61%, were dissolved in varying quantities of toluene and placed in a 1-liter reaction flask equipped with a stirrer, thermometer, water-cooled condenser, and graduated dropping funnel.

(B) Chain-extending agent solution 12.92 grams of N-hydroxypropyl ethylene diamine were placed in a 500-milliliter beaker and dissolved in varying quantities of ethanol.

(C) Preparation of urethane polymer solution

Chain-extending agent (B) was added at room temperature and with vigorous stirring to the isocyanate-terminated prepolymer (A) in the reaction flask. During the addition the temperature of the reaction mixture increased from about 25° C. to 28° C. The stirring was continued for about 30 minutes and a clear homogeneous urethane polymer solution was obtained.

Films cast from the urethane polymer solutions had the physical properties listed below in Table IV. The varying quantities of toluene and ethanol are also included in Table IV.

TABLE IV

|  | Example | | | | | | |
| --- | --- | --- | --- | --- | --- | --- | --- |
|  | 16 | 17 | 18 | 19 | 20 | 21 | 22 |
| Toluene, grams | 374.0 | 350.6 | 311.6 | 233.6 | 155.8 | 116.8 | 93.4 |
| Ethanol, grams | 93.4 | 116.8 | 155.8 | 233.8 | 311.6 | 350.6 | 374.0 |
| Toluene/ethanol ratio | 4:1 | 3:1 | 2:1 | 1:1 | 1:2 | 1:3 | 1:4 |
| Film properties: | | | | | | | |
| Tensile strength, p.s.i. | 3,100 | 3,000 | 3,600 | 2,800 | 2,000 | 1,900 | 2,100 |
| Modulus, p.s.i.: | | | | | | | |
| 300% | 450 | 620 | 690 | 580 | 460 | 510 | 570 |
| 100% | 270 | 260 | 290 | 260 | 230 | 240 | 260 |
| Elongation, percent | 690 | 700 | 700 | 730 | 790 | 680 | 700 |
| Viscosity: | | | | | | | |
| Gardner tube | Z-5 | Z-2 | X | U | V | S | D |
| Stokes (approximate at 25° C.) | 98.5 | 36.2 | 12.9 | 6.27 | 8.84 | 5.0 | 1.0 |

EXAMPLES 23–25

(A) Isocyanate-terminated prepolymer solution 30.27 pounds of an isocyanate-terminated prepolymer, having a free isocyanate value of 3.73, and prepared by reacting 63.6 pounds of toluene diisocyanate with a mixture of 49.1 pounds of a polyoxypropylene glycol having a molecular weight of 440 and 65.8 pounds of a polyoxypropylene glycol having a molecular weight of 675 were dissolved in 25.92 pounds of toluene in a large mixing and storage tank.

(B) Chain-extending agent solution 2.9 pounds of N-hydroxypropyl ethylene diamine were dissolved in 51.9 pounds of isopropanol in a large mixing and storage tank.

(C) Preparation of urethane polymer solution

Chain-extending agent (B) was metered into a reaction vessel at the rate of 755 grams per minute. The prepolymer solution was metered into the same reaction vessel at varying rates for each example of 736 grams per minute, 774 grams per minute and 814 grams per minute, respectively. The reaction mixture was vigorously stirred and, in each case, the reaction product was continuously withdrawn from the reaction mixture.

Films cast from the urethane polymer solutions had the physical properties listed below in Table V. The rate of addition of the urethane polymer solution is also shown in Table V.

TABLE V

|  | Example | | |
| --- | --- | --- | --- |
|  | 23 | 24 | 25 |
| Solution properties: | | | |
| Solids content, percent | 30 | 30 | 30 |
| Viscosity, Brookfield, cps | 1,720 | 6,050 | 2,140 |
| Rate of addition of prepolymer solution in grams per minute | 736 | 774 | 814 |
| NH/NCO | 1.05 | 1.00 | 0.95 |
| Film properties: | | | |
| Tensile, p.s.i. | 4,840 | 6,910 | 6,600 |
| 300% modulus, p.s.i. | 4,620 | 5,300 | 3,400 |
| 100% modulus, p.s.i. | 1,800 | 1,880 | 1,500 |
| Elongation, percent | 315 | 375 | 445 |
| Split tear, p.s.i. | 330 | 364 | 255 |

Example 1 above represents a urethane polymer solution of this invention having excellent film-forming properties and illustrates the use of a polyurethane-type prepolymer, an aromatic diamine chain-extending agent, and a primary alcohol, ethanol, as the solvent. Example 2 shows the use of a secondary alcohol, isopropyl alcohol, as the diamine solvent.

Example 3 is a comparative example and shows the relative physical properties of a film prepared by the process of this invention, as compared to a film prepared from the same reactants but according to a conventional latex procedure. The process of this invention is shown to yield superior properties and do not require the use of a fusion technique or a hydrolytic stability reducing surfactant.

Example 4 and comparative Example 5 demonstrate the use of an aliphatic diamine chain-extending agent and again show the enhanced physical properties of films prepared according to the process of this invention as compared to a film produced by the latex procedure.

Example 6 shows the use of a polyether type prepolymer in preparing a urethane polymer solution. Example 7 demonstrates the use of a polyester type prepolymer in the practice of this invention.

Examples 4, 7, and 8–15 illustrate that in the process of this invention, one may utilize diamine compounds having a reactive hydrogen functionality of greater than two in reaction with free isocyanate groups and still obtain a high molecular weight linear urethane polymer solution which does not form "infinite networks" causing gelation and insolubilization.

Examples 8–15 also indicate that to obtain urethane polymer solutions capable of casting films of excellent physical properties, one should utilize ratios of the isocyanate-terminated prepolymer to diamine chain-extending agent such that the amine/NCO ratio is from about 0.9/1 to about 1.05/1.0.

Examples 16–22 illustrate that homogeneous urethane polymer solutions which provide films having excellent physical characteristics are obtained when the ratio of inert solvent to alcohol solvent is varied from about 4:1 to about 1:4. The fact that films having excellent characteristics are provided when cosolvent systems of such widely varying solvent ratios are utilized is a distinct advantage of this invention as the cosolvent system can be adjusted to insure predetermined solution viscosities and film drying rates.

Examples 23–25 demonstrate that urethane polymer solutions having excellent film forming properties can be obtained by continuous operation of the process of this invention. Continuous operation of the process is conducted in the same manner as batch operation except the solutions of the urethane prepolymer and the diamine chain extender are each charged continuously into a reaction vessel and the reaction product is continuously wtihdrawn from said vessel.

The urethane polymer solutions of this invention have been found to have excellent utility in preparing films, coatings, castings, and the like products.

As many widely different embodiments of this invention may be made without departing from the spirit and scope thereof, it is understood that this invention is not limited, except as defined in the appended claims.

What is claimed is:

1. In a process for the preparation of a solution of a non-gelling urethane polymer by solution polymerization wherein a solution of an isocyanate-terminated prepolymer is chain-extended with a diamine chain-extending agent the improvement comprising.

conducting the polymerization in the presence of a cosolvent system consisting essentially of an inert solvent and an alcohol selected from the group consisting of methanol, ethanol, isopropanol and butanol wherein the weight ratio of inert solvent to alcohol is from about 4:1 to about 1:4.

2. The process of claim 1 wherein the polymerization is conducted by (1) dissolving the prepolymer in an inert solvent to prepare solution A, (2) dissolving the diamine chain-extending agent in the alcohol to prepare solution B, and (3) mixing solutions A and B to form the polyurethane solution.

3. The process of claim 2 wherein said isocyanate-terminated prepolymer is the reaction product of an isocyanate and a polyether.

4. The process of claim 2 wherein said diamine chain-extending agent is reacted with said isocyanate-terminated prepolymer at an amine/NCO ratio of from about 0.9/1.0 to 1.1/1.0.

5. The process of claim 2 wherein the cosolvent contains from about 10 percent to 90 percent by weight of prepolymer plus diamine chain-extending agent.

6. The process of claim 2 wherein said prepolymer is reacted with said chain-extending agent at a temperature of from about −10° C. to about the reflux temperature of the reaction mixture.

7. The process of claim 2 wherein said prepolymer is reacted with said chain-extending agent at about room temperature.

8. The process of claim 2 wherein said diamine chain-extending agent is selected from the group consisting of aliphatic alicyclic, aromatic and inorganic diamine compounds.

9. The process of claim 2 wherein said diamine chain-extending agent is 2-methylpiperazine or N-hydroxypropyl ethylenediamine.

10. The process of claim 2 wherein said inert solvent is toluene or tetrahydrofuran.

References Cited

UNITED STATES PATENTS

| | | | |
|---|---|---|---|
| 3,373,143 | 3/1968 | Chilvers et al. | 260—75 |
| 3,509,102 | 4/1970 | Horn et al. | 260—77.5 |
| 3,461,103 | 8/1969 | Keberle et al. | 260—75 |

OTHER REFERENCES

Saunders et al.: Polyurethanes Part I, Interscience, New York (1962), pp. 63–75.

DONALD E. CZAJA, Primary Examiner

H. S. COCKERAM, Assistant Examiner

U.S. Cl. X.R.

260—30.8 DS, 32.6 N, 33.4 UB, 33.6 UB, 75 NE, 75 NP, 75 NQ, 77.5 AA, 77.5 AM, 77.5 AQ, 77.5 MA